(12) United States Patent
Lu et al.

(10) Patent No.: US 10,969,636 B2
(45) Date of Patent: Apr. 6, 2021

(54) ACTIVE DEVICE SUBSTRATE AND DRIVING METHOD THEREOF

(71) Applicant: Au Optronics Corporation, Hsinchu (TW)

(72) Inventors: Ssu-Hui Lu, Hsinchu (TW); Wei-Hung Kuo, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/566,906

(22) Filed: Sep. 11, 2019

(65) Prior Publication Data

US 2020/0371390 A1    Nov. 26, 2020

(30) Foreign Application Priority Data

May 21, 2019    (TW) .................................. 108117428

(51) Int. Cl.
*G09G 3/36* (2006.01)
*G02F 1/1362* (2006.01)

(52) U.S. Cl.
CPC ...... *G02F 1/1362* (2013.01); *G02F 2201/123* (2013.01)

(58) Field of Classification Search
USPC ............. 345/99, 204, 205, 206, 211; 257/43
See application file for complete search history.

(56) References Cited

U.S. PATENT DOCUMENTS

| | | | |
|---|---|---|---|
| 9,934,723 B2 | 4/2018 | Lee et al. | |
| 2005/0243045 A1 | 11/2005 | Kim | |
| 2016/0026046 A1* | 1/2016 | Itoh | G02F 1/136286 257/43 |
| 2017/0108744 A1* | 4/2017 | Tsuei | G02F 1/134363 345/206 |
| 2017/0139300 A1* | 5/2017 | Itoh | H01L 27/124 345/99 |
| 2018/0331132 A1* | 11/2018 | Zeng | H01L 29/786 345/204 |
| 2019/0057980 A1* | 2/2019 | Su | H01L 27/1222 |
| 2019/0181272 A1* | 6/2019 | Zhou | H01L 21/31111 |
| 2019/0286267 A1* | 9/2019 | Lin | G06F 3/044 345/211 |
| 2020/0012369 A1* | 1/2020 | Guo | H01L 27/3225 |
| 2020/0183235 A1* | 6/2020 | Tsuei | G06F 3/0412 |
| 2020/0287052 A1* | 9/2020 | Qu | H01L 29/6675 |
| 2021/0013344 A1* | 1/2021 | Ye | H01L 21/02565 |

* cited by examiner

*Primary Examiner* — Thuy N Pardo
(74) *Attorney, Agent, or Firm* — JCIPRNET (57) ABSTRACT

An active device substrate includes a substrate, first to third scan lines, a first data line, a second data line, a first active device, and a first pixel electrode. The first scan line, the second scan line, and the third scan line are extending along a first direction. The first data line and the second data line are extending along a second direction. The first active device includes a first gate, a second gate, a first semiconductor pattern layer, a first source, and a first drain. The first gate is electrically connected to the first scan line. The second gate is electrically connected to the second scan line. The first scan line and the second scan line transmit different driving signals. The first source is electrically connected to the first data line. The first pixel electrode is electrically connected to the first drain of the first active device.

2 Claims, 7 Drawing Sheets

ACTIVE DEVICE SUBSTRATE AND DRIVING METHOD THEREOF

CROSS-REFERENCE TO RELATED APPLICATION

This application claims the priority benefit of Taiwan application serial no. 108117428, filed on May 21, 2019. The entirety of the above-mentioned patent application is hereby incorporated by reference herein and made a part of this specification.

BACKGROUND

Technical Field

The disclosure relates to an active device substrate and a driving method thereof, in particular to an active device substrate including a dual-gate active device and a driving method thereof.

Description of Related Art

Display panels can be seen everywhere in the life of human beings, for example, various electronic devices such as intelligent mobile phones, televisions, computers and intelligent watches are provided with the display panels. With the development of technology, the requirement of people on the display quality of the display panel increases. In order to show more delicate images, the display panel needs to have a sufficiently high resolution ratio. The display panel generally includes an active device substrate, an opposite substrate and a display medium clamped between the active device substrate and the opposite substrate. However, in the display panel with the high resolution ratio, a space capable of accommodating scan lines in a display region of the active device substrate is limited, and is difficult to arrange a dual-gate active device, thus causing the problem of easy electric leakage of the active device substrate.

SUMMARY

The disclosure provides an active device substrate capable of solving the problem of electric leakage of the active device substrate.

A driving method of the active device substrate can solve the problem of electric leakage of the active device substrate.

At least one embodiment of the disclosure provides an active device substrate, which includes a substrate, a first scan line, a second scan line, a third scan line, a first data line, a second data line, a first active device and a first pixel electrode. The first scan line, the second scan line, the third scan line, the first data line and the second data line are located on the substrate. The first scan line, the second scan line and the third scan line are substantially extending along a first direction. The first data line and the second data line are extending along a second direction. The first direction intersects with the second direction. The first active device includes a first gate, a second gate, a first semiconductor pattern layer, a first source and a first drain. The first gate is electrically connected to the first scan line. The second gate is electrically connected to the second scan line. The first scan line and the second scan line transmit different driving signals. The first semiconductor pattern layer overlaps the first gate and the second gate. The first source and the first drain are electrically connected to the first semiconductor pattern layer. The first source is electrically connected to the first data line. The first pixel electrode is electrically connected to the first drain of the first active device.

At least one embodiment of the disclosure provides a driving method of an active device substrate, and the method includes the following steps. An active device substrate is provided. A first driving signal is applied to the first scan line. A second driving signal is applied to the second scan line. A first signal is applied to the first data line.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
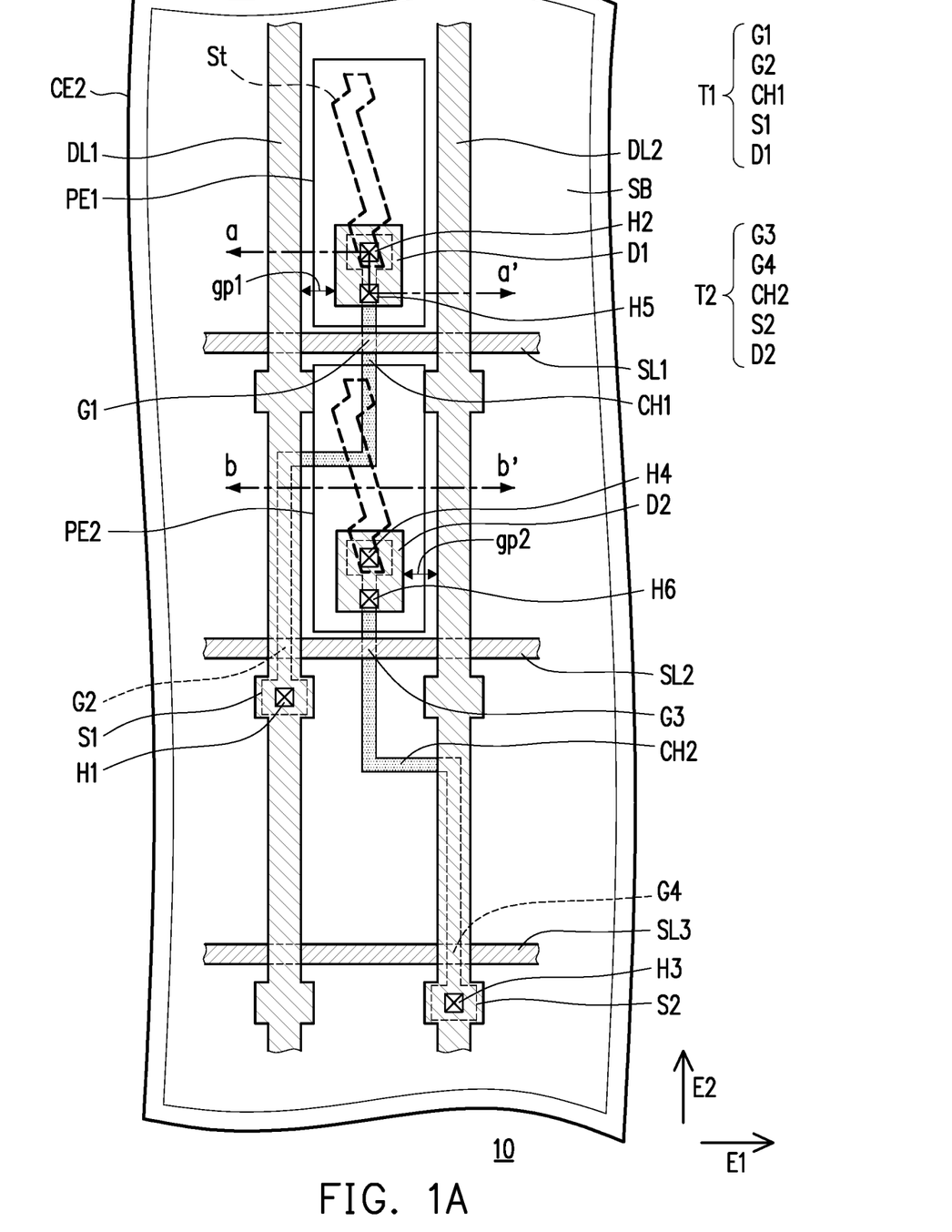
FIG. 1A is a schematic top view of an active device substrate according to one embodiment of the disclosure.
Figure 1B:
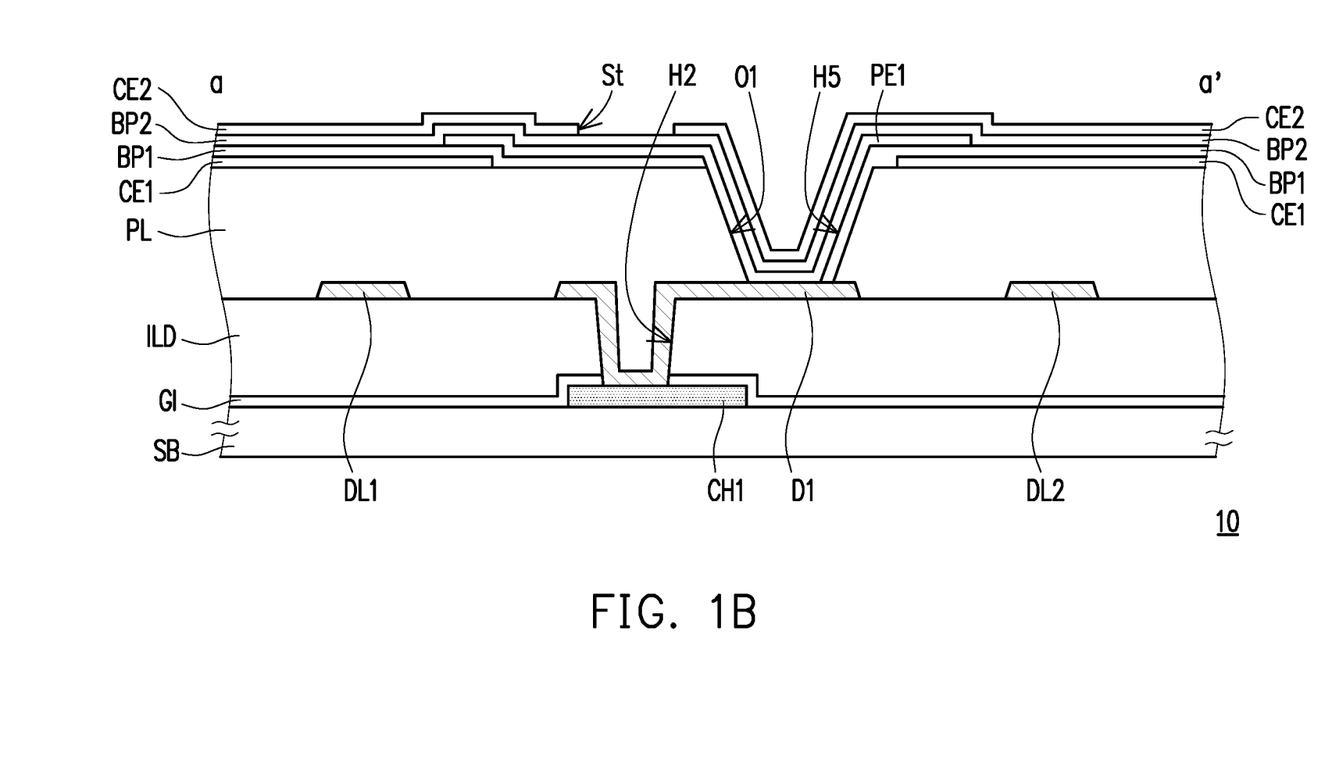
FIG. 1B is a schematic cross-sectional view taken along a cross-sectional line aa' in the FIG. 1A.
Figure 1C:
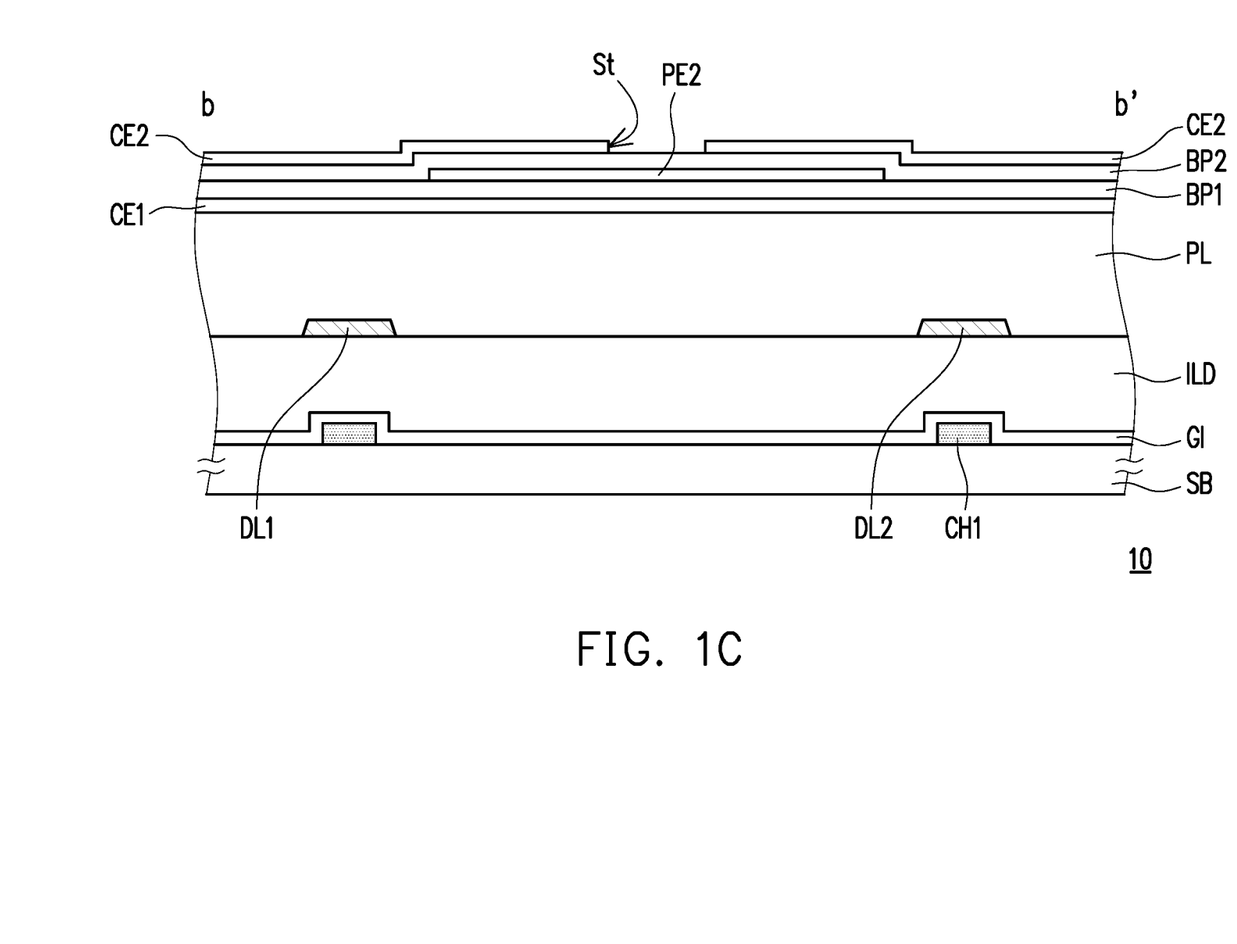
FIG. 1C is a schematic cross-sectional view taken along a cross-sectional line bb' in the FIG. 1A.

FIG. 1A is a schematic top view of an active device substrate according to one embodiment of the disclosure. FIG. 1B is a schematic cross-sectional view along a cross-sectional line aa' in the FIG. 1A. FIG. 1C is a schematic cross-sectional view along a cross-sectional line bb' in the FIG. 1A. For convenience of illustration, partial components in FIG. 1B and FIG. 1C are omitted to draw in FIG. 1A.

Referring to FIG. 1A, FIG. 1B, and FIG. 1C, an active device substrate 10 includes a substrate SB, a first scan line SL1, a second scan line SL2, a third scan line SL3, a first data line DL1, a second data line DL2, a first active device T1, and a first pixel electrode PE1. In the present embodiment, the active device substrate 10 further includes a second active device T2 and a second pixel electrode PE2. In some embodiments, the active device substrate 10 further includes a black matrix (not shown) overlapping the first scan line SL1, the second scan line SL2, the third scan line SL3, the first data line DL1, and the second data line DL2.

Materials for making the substrate SB can be glass, quartz, organic polymers, or light-shielding/reflection materials (such as conductive materials, metal, wafers, ceramics, or other applicable materials), or other applicable materials.

If the conductive materials or metal is used, an insulation layer (not shown) covers the substrate SB so as to avoid the problem of short circuit.

The first scan line SL1, the second scan line SL2, the third scan line SL3, the first data line DL1, and the second data line DL2 are located on the substrate SB. The first scan line SL1, the second scan line SL2, and the third scan line SL3 are substantially extending along a first direction E1. The first data line DL1 and the second data line DL2 are extending along a second direction E2. The first direction E1 intersects with the second direction E2.

The first active device T1 includes a first gate G1, a second gate G2, a first semiconductor pattern layer CH1, a first source S1, and a first drain D1. The second active device T2 includes a third gate G3, a fourth gate G4, a second semiconductor pattern layer CH2, a second source S2, and a second drain D2.

The first semiconductor pattern layer CH1 and the second semiconductor pattern layer CH2 are located on the substrate SB. A gate insulation layer GI covers the substrate SB, the first semiconductor pattern layer CH1, and the second semiconductor pattern layer CH2.

The first gate G1, the second gate G2, the third gate G3, the fourth gate G4, the first scan line SL1, the second scan line SL2, and the third scan line SL3 are located on the gate insulation layer GI. The first semiconductor pattern layer CH1 overlaps the first gate G1 and the second gate G2. The first gate G1 is electrically connected to the first scan line SL1. The second gate G2 is electrically connected to the second scan line SL2. The first scan line SL1 and the second scan line SL2 transmit different driving signals. The second semiconductor pattern layer CH2 overlaps the third gate G3 and the fourth gate G4. The third gate G3 is electrically connected to the second scan line SL2. The fourth gate G4 is electrically connected to the third scan line SL3. The second scan line SL2 and the third scan line SL3 transmit different driving signals.

In the present embodiment, the first active device T1 and the second active device T2 share the second scan line SL2 and achieve the dual-gate active device effect under the condition of not increasing the total number of the scan lines, thus maintaining or improving the aperture ratio of the active device substrate 10.

An interlayer insulation layer ILD covers the first gate G1, the second gate G2, the third gate G3, the fourth gate G4 and a gate insulation layer GI. The first source S1, the first drain D1, the second source S2, the second drain D2, the first data line DL1 and the second data line DL2 are located on the interlayer insulation layer ILD. The first source S1 and the first drain D1 are electrically connected to the first semiconductor pattern layer CH1 respectively through contact windows H1 and H2; the second source S2 and the second drain D2 are electrically connected to the second semiconductor pattern layer CH2 respectively through contact windows H3 and H4. The contact windows H1, H2, H3 and H4, for example, penetrate through the gate insulation layer GI and the interlayer insulation layer ILD. The first source S1 is electrically connected to the first data line DL1. The second source S2 is electrically connected to the second data line DL2.

In the present embodiment, the first source S1, the first drain D1, the first data line DL1, the second source S2, the second drain D2 and the second data line DL2 belong to the same film layer. The first source S1 and the first data line DL1 are connected into a whole while a gap gp1 is provided between the drain D1 and the first data line DL1. The second source S2 and the second data line DL2 are connected into a whole while a gap gp2 is provided between the second drain D2 and the second data line DL2. In the present embodiment, the gap gp1 and the gap gp2 are greater than 2 microns. In the present embodiment, the first drain D1 and the second drain D2 are aligned along the second direction E2, a gap gp2 is provided between the first drain D1 and the second data line DL2, and a gap gp1 is provided between the second drain D2 and the first data line DL1.

Materials for making the first gate G1, the second gate G2, the third gate G3, the fourth gate G4, the first scan line SL1, the second scan line SL2, the third scan line SL3, the first source S1, the first drain D1, the second source S2, the second drain D2, the first data line DL1 and the second data line DL2, for example, include metal such as gold, silver, copper, tin, lead, hafnium, tungsten, molybdenum, neodymium, titanium, tantalum, aluminium and zinc, alloy of the above-mentioned metal, oxides of the above-mentioned metal, nitrides of the above-mentioned metal, or a combination of the above-mentioned materials, or other conductive materials.

The first semiconductor pattern layer CH1 and the second semiconductor pattern layer CH2 are of single-layer or multi-layer structures, and include amorphous silicon, polycrystalline silicon, microcrystalline silicon, monocrystal silicon, organic semiconductor materials, oxide semiconductor materials (such as indium zinc oxides, indium gallium zinc oxides, or other proper materials, or a combination of the above-mentioned materials), or other proper materials, or above-mentioned materials including dopants, or a combination of the above-mentioned materials.

A flat layer PL is located on the source S, the drain D, the first data line DL1, the second data line DL2 and the interlayer insulation layer ILD. A first common electrode CE1 is located on the flat layer PL. The insulation layer BP1 is located on the first common electrode CE1 and the flat layer PL.

The first pixel electrode PE1 and the second pixel electrode PE2 are located on the insulation layer BP1. The first pixel electrode PE1 is electrically connected to the first drain D1 of the first active device T1 through a contact window H5. The second pixel electrode PE2 is electrically connected to the second drain D2 of the second active device T2 through a contact window H6. The contact windows H5 and H6, for example, penetrate through the flat layer PL and the insulation layer BP1. The contact window H5 overlaps an opening O1 of the flat layer PL. The insulation layer BP2 is located on the first pixel electrode PE1, the second pixel electrode PE2 and the insulation layer BP1.

The vertical projection of the pixel electrode on the substrate SB is between the vertical projections of two adjacent scan lines on the substrate SB and between the vertical projections of two adjacent data lines on the substrate SB. For example, the vertical projection of the second pixel electrode PE2 on the substrate SB is between the vertical projection of the first scan line SL1 on the substrate SB and the vertical projection of the second scan line SL2 on the substrate SB, and between the vertical projection of the first data line DL1 on the substrate SB and the vertical projection of the second data line DL2 on the substrate SB.

A second common electrode CE2 is located on the insulation layer BP2. The second common electrode includes a plurality of slits St respectively overlapping the first pixel electrode PE1 and the second pixel electrode PE2.

Materials for making the first common electrode CE1, the first pixel electrode PE1, the second pixel electrode PE2 and the second common electrode CE2 can include transparent metal oxide conductive materials such as (not limited to)

indium tin oxides, indium zinc oxides, aluminium tin oxides, aluminium zinc oxides, indium gallium zinc oxides or stack layers of at least two of the above-mentioned materials.

Based on the above, the first semiconductor pattern layer CH1 overlaps the first gate G1 and the second gate G2, and the first gate G1 and the second gate G2 are respectively and electrically connected to the first scan line SL1 and the second scan line SL2, thus reaching the effect of solving the problem of electric leakage of the active device substrate 10 by the dual-gate structure and electric characteristics thereof when the turn-on time of the first scan line SL1 and the turn-on time of the second scan line SL2 overlap.

The active device substrate 10 can be applicable to display device. In one embodiment, the display device is, for example, liquid crystal display device. In another embodiment, the display device is, for example, display device with a high resolution ratio. As mentioned above, the active device substrate 10 has the advantages of improved aperture ratio and low electric leakage. The advantages are also realized by the display device with the high resolution ratio using the active device substrate 10.

Figure 2A:
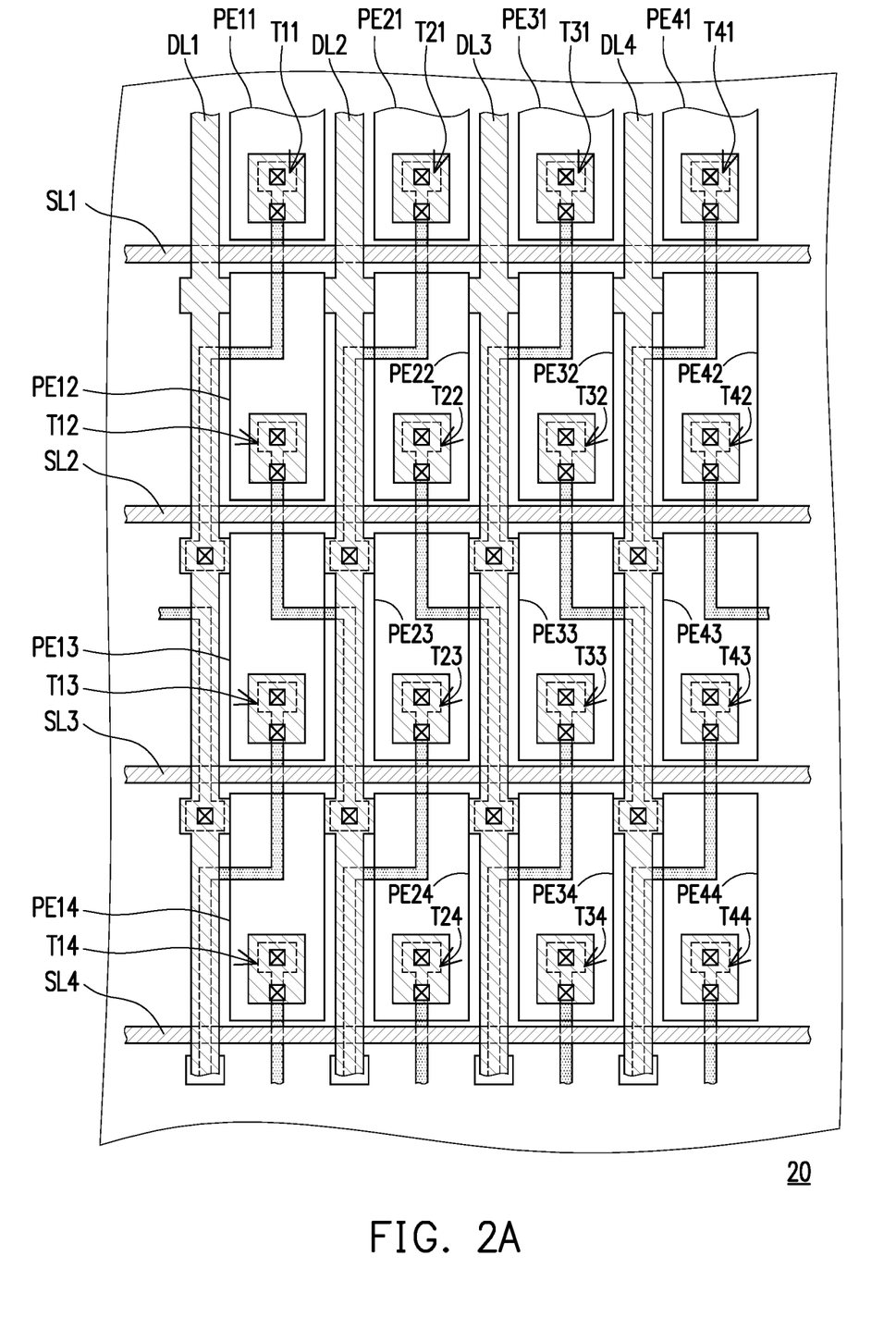
FIG. 2A is a schematic top view of an active device substrate according to one embodiment of the disclosure.
Figure 2B:
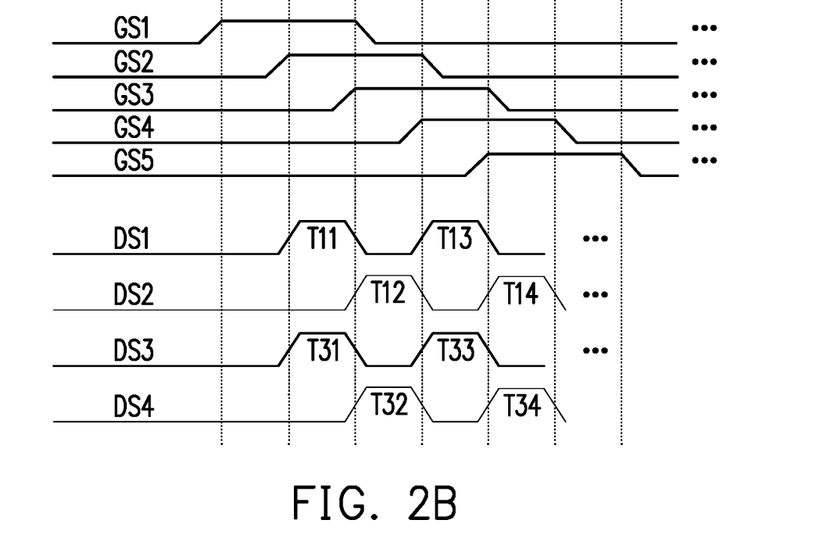
FIG. 2B is a time sequence waveform diagram of a driving method of an active device substrate according to one embodiment of the disclosure.
Figure 2C:
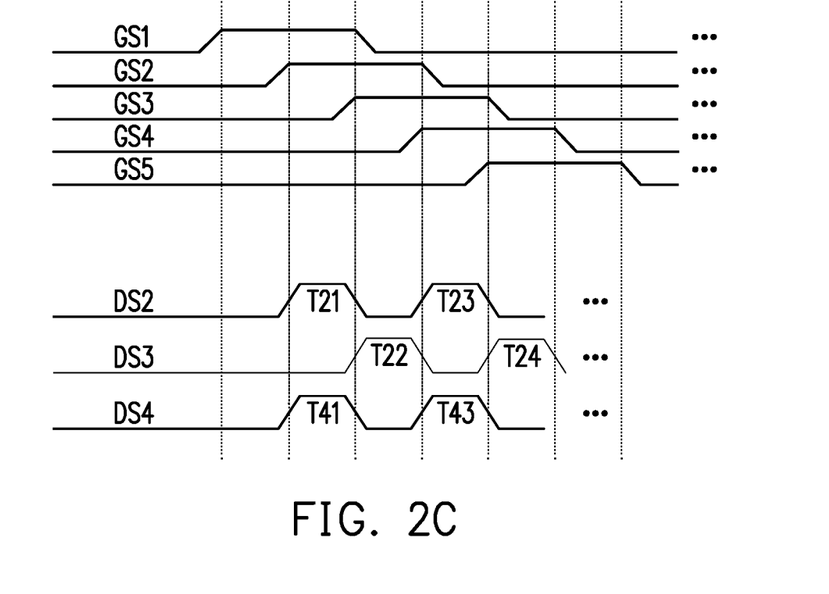
FIG. 2C is a time sequence waveform diagram of a driving method of an active device substrate according to one embodiment of the disclosure.

FIG. 2A is a schematic top view of an active device substrate according to one embodiment of the disclosure. FIG. 2B is a time sequence waveform diagram of a driving method of an active device substrate according to one embodiment of the disclosure. FIG. 2C is a time sequence waveform diagram of a driving method of an active device substrate according to one embodiment of the disclosure. It should be noted that the embodiments from FIG. 2A to FIG. 2C use component labels and partial contents of the embodiments from FIG. 1A to FIG. 1C, wherein identical or similar labels are used for expressing identical or similar components, and the illustration about the same technical contents is omitted. In FIG. 2A, each active device is similar to the first active device T1 or the second active device T2 in FIG. 1A to FIG. 1C, thus for illustration about omitted parts, the above-mentioned embodiments can be referred to, and the descriptions thereof are omitted herein. In FIG. 2A, each pixel electrode is similar to the first pixel electrode PE1 or the second pixel electrode PE2 from FIG. 1A to FIG. 1C, thus for illustration about omitted parts, the above-mentioned embodiments can be referred to, and the descriptions thereof are omitted herein. For convenient illustration, partial components are omitted to draw in FIG. 2A.

Referring to FIG. 2A, a pixel electrode PE11 to a pixel electrode PE44 are respectively and electrically connected to an active device T11 to an active device T44. The active device T11, an active device T21, an active device T31 and an active device T41 are electrically connected to the first scan line SL1 and the second scan line SL2. An active device T12, an active device T22, an active device T32 and an active device T42 are electrically connected to the second scan line SL2 and the third scan line SL3. An active device T13, an active device T23, an active device T33 and an active device T43 are electrically connected to the third scan line SL3 and a fourth scan line SL4. An active device T14, an active device T24, an active device T34 and the active device T44 are electrically connected to the fourth scan line SL4 and a fifth scan line (not shown).

The active device T11 and the active device T13 are electrically connected to the first data line DL1. The active device T12, the active device T14, the active device T21 and the active device T23 are electrically connected to the second data line DL2. The active device T22, the active device T24, the active device T31 and the active device T33 are electrically connected to the third data line DL3. The active device T32, the active device T34, the active device T41 and the active device T43 are electrically connected to the fourth data line DL4. The active device T42 and the active device T44 are electrically connected to the fifth data line (not shown). In the present embodiment, the third data line DL3 and the fourth data line DL4 are extending along the second direction E2.

Referring to FIG. 2A and FIG. 2B together, a first driving signal GS1 is applied to the first scan line SL1. In the period of applying the first driving signal GS1 to the first scan line SL1, a second driving signal GS2 is applied to the second scan line SL2. In the period of applying the second driving signal GS2 to the second scan line SL2, a third driving signal GS3 is applied to the third scan line SL3. In the period of applying the third driving signal GS3 to the third scan line SL3, a fourth driving signal GS4 is applied to the fourth scan line SL4. In the period of applying the fourth driving signal GS4 to the fourth scan line SL4, a fifth driving signal GS5 is applied to the fifth scan line. In the present embodiment, the first driving signal GS1, the second driving signal GS2, the third driving signal GS3, the fourth driving signal GS4 and the fifth driving signal GS5 are different driving signals. For example, the first driving signal GS1, the second driving signal GS2, the third driving signal GS3, the fourth driving signal GS4 and the fifth driving signal GS5 are switched on and off at different time sequences. In other words, the first driving signal GS1 applied to the first scan line SL1, the second driving signal GS2 applied to the second scan line SL2, the third driving signal GS3 applied to the third scan line SL3, the fourth driving signal GS4 applied to the fourth scan line SL4, and the fifth driving signal GS5 applied to the fifth scan line SL5 are asynchronous at the time sequences.

The first driving signal GS1, the second driving signal GS2, the third driving signal GS3, the fourth driving signal GS4 and the fifth driving signal GS5 have similar pulse widths. The first driving signal GS1 and the second driving signal GS2 partially overlap, the second driving signal GS2 and the third driving signal GS3 partially overlap, the third driving signal GS3 and the fourth driving signal GS4 partially overlap, and the fourth driving signal GS4 and the fifth driving signal GS5 partially overlap. In other words, signals are applied to the first scan line SL1 and the second scan line SL2 at the same time in part of time, signals are applied to the second scan line SL2 and the third scan line SL3 at the same time in part of time, signals are applied to the third scan line SL3 and the fourth scan line SL4 at the same time in part of time, and signals are applied to the fourth scan line SL4 and the fifth scan line at the same time in part of time.

In the period that the first driving signal GS1 is applied to the first scan line SL1 and the second driving signal GS2 is applied to the second scan line SL2, a first signal DS1 is applied to the first data line DL1 so as to actuate the active device T11, and a third signal DS3 is applied to the third data line DL3 so as to actuate the active device T31. When the pulses of the first driving signal GS1, the second driving signal GS2 and the first signal DS1 overlap, the first signal DS1 passes through the active device T11 and is transmitted to the pixel electrode PE11. When the pulses of the first driving signal GS1, the second driving signal GS2 and the third signal DS3 overlap, the third signal DS3 passes through the active device T31 and is transmitted to the pixel electrode PE31.

In the period that the second driving signal GS2 is applied to the second scan line SL2 and the third driving signal GS3 is applied to the third scan line SL3, a second signal DS2 is applied to the second data line DL2 so as to actuate the active device T12, and a fourth signal DS4 is applied to the fourth data line DL4 so as to actuate the active device T32. When the pulses of the second driving signal GS2, the third driving signal GS3 and the second signal DS2 overlap, the second signal DS2 passes through the active device T12 and is transmitted to the pixel electrode PE12. When the pulses of the second driving signal GS2, the third driving signal GS3 and the fourth signal DS4 overlap, the fourth signal DS4 passes through the active device T32 and is transmitted to the pixel electrode PE32.

Referring to FIG. 2A and FIG. 2C together, in the period that the first driving signal GS1 is applied to the first scan line SL1 and the second driving signal GS2 is applied to the second scan line SL2, the second signal DS2 is applied to the second data line DL2 so as to actuate the active device T21, and the fourth signal DS4 is applied to the fourth data line DL4 so as to actuate the active device T41. When the pulses of the first driving signal GS1, the second driving signal GS2 and the second signal DS2 overlap, the second signal DS2 passes through the active device T21 and is transmitted to the pixel electrode PE21. When the pulses of the first driving signal GS1, the second driving signal GS2 and the fourth signal DS4 overlap, the fourth signal DS4 passes through the active device T41 and is transmitted to the pixel electrode PE41.

In the period that the second driving signal GS2 is applied to the second scan line SL2 and the third driving signal GS3 is applied to the third scan line SL3, the third signal DS3 is applied to the third data line DL3 so as to actuate the active device T22. When the pulses of the second driving signal GS2, the third driving signal GS3 and the third signal DS3 overlap, the third signal DS3 passes through the active device T22 and is transmitted to the pixel electrode PE22.

The actuating mode of other active devices is similar to the above mentioned, so that the descriptions thereof are omitted herein.

An active device substrate 20 is applicable to display devices. In one embodiment, the display device is, for example, a liquid crystal display device. In another embodiment, the display device is, for example, a display device with a high resolution ratio.

Based on the above, in the active device substrate 20 of the present embodiment, the active devices in adjacent upper and lower rows share one scan line, thus reducing the total number of the scan lines and improving the aperture ratio of the active device substrate 20. Moreover, the active device has a dual-gate structure, and can thus solve the problem of electric leakage of the active device substrate 20. Therefore, when the active device substrate 20 is used in the display device with the high resolution ratio, the display device with the high resolution ratio has the advantages of high aperture ratio and low electric leakage.

Figure 3A:
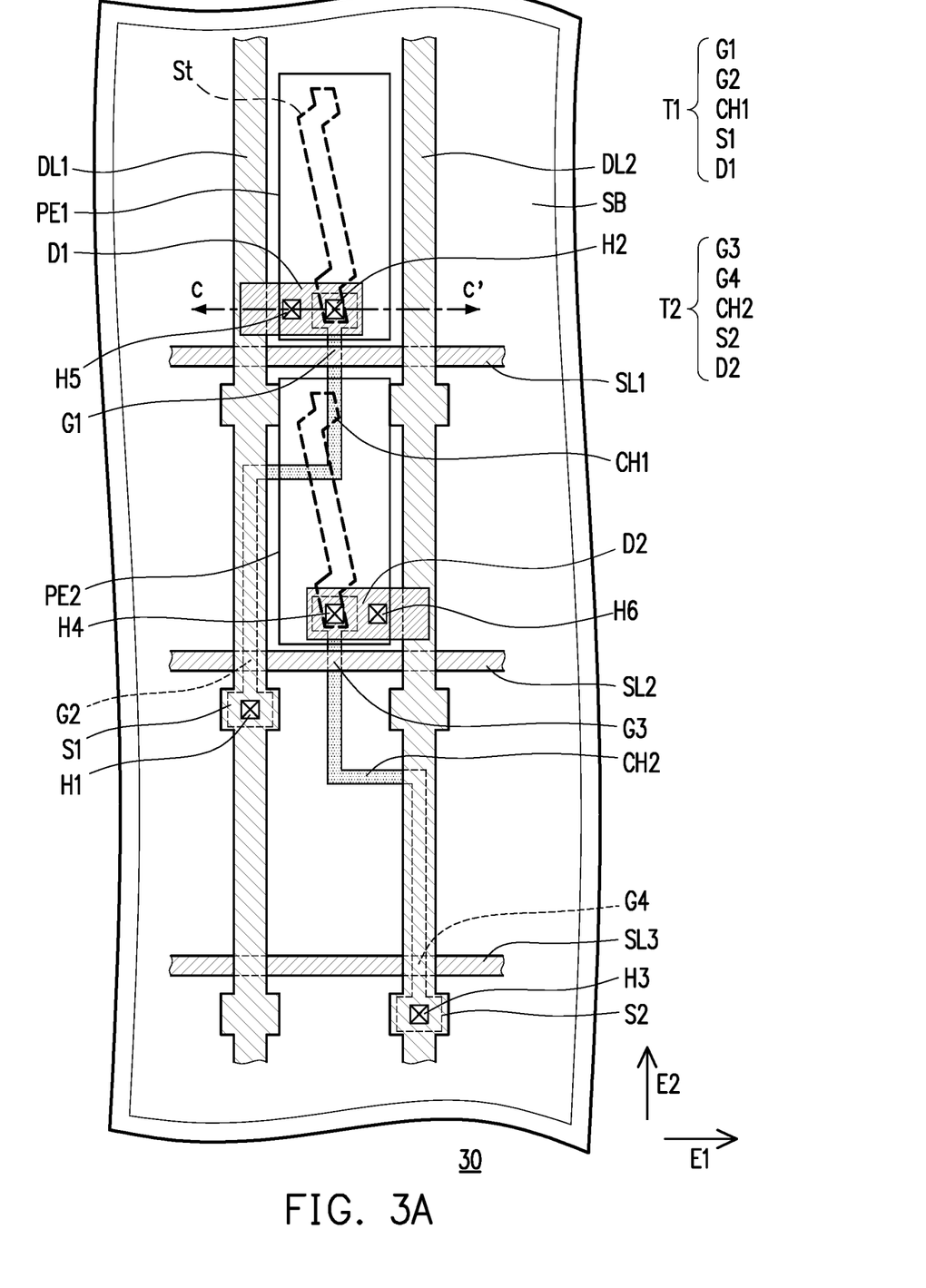
FIG. 3A is a schematic top view of an active device substrate according to one embodiment of the disclosure.
Figure 3B:
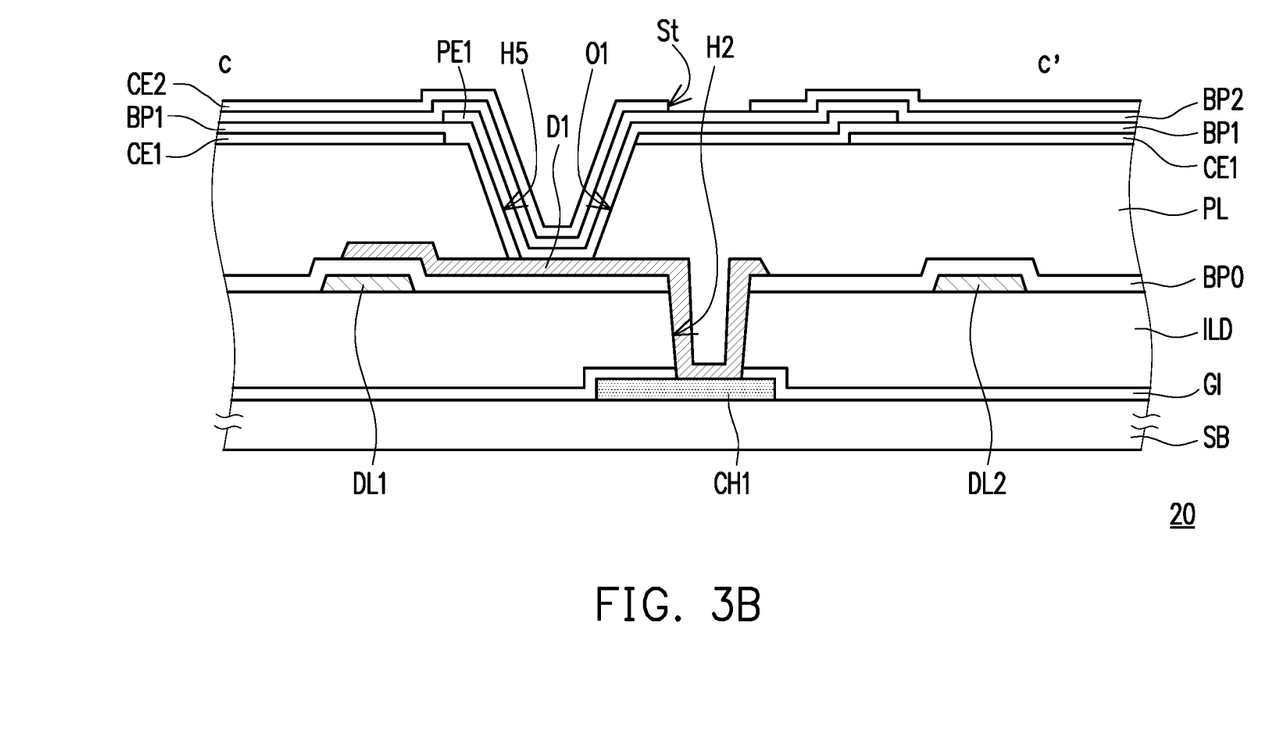
FIG. 3B is a schematic cross-sectional view along a cross-sectional line cc' in the FIG. 3A.

FIG. 3A is a schematic top view of an active device substrate according to one embodiment of the disclosure. FIG. 3B is a schematic cross-sectional view along a cross-sectional line cc' in the FIG. 3A. It should be noted that the embodiments of FIG. 3A and FIG. 3B use component labels and partial contents of the embodiments from FIG. 1A to FIG. 1C, wherein identical or similar labels are used for expressing identical or similar components, and the illustration about the same technical contents is omitted. For illustration about omitted parts, the above-mentioned embodiments can be referred to, and the descriptions thereof are omitted herein.

Main differences between an active device substrate 30 in FIG. 3A and FIG. 3B and the active device substrate 10 in FIG. 1A to FIG. 1C are that: in the active device substrate 30, the first drain D1 and the first data line DL1 belong to different film layers, and the second drain D2 and the second data line DL2 belong to different film layers.

Referring to FIG. 3A and FIG. 3B, in the present embodiment, the first source S1, the first data line DL1, the second source S2 and the second data line DL2 belong to the same film layer. The first source S1 and the first data line DL1 are connected into a whole, and the second source S2 and the second data line DL2 are connected into a whole. An insulation layer BP0 is located on the first source S1, the first data line DL1, the second source S2, the second data line DL2 and the interlayer insulation layer ILD. The first drain D1 and the second drain D2 are located on the insulation layer BP0. The insulation layer BP0 is located between the first drain D1 and the first data line DL1 as well as between the second drain D2 and the second data line DL2.

In the present embodiment, the first drain D1 partially overlaps the first data line DL1, and the second drain D2 partially overlaps the second data line DL2, thereby reducing the pitch of adjacent sub-pixels in the first direction E1. For example, the pitch of sub-pixels can be reduced to a value being smaller than 6 microns, thereby improving the resolution ratio of the active device substrate 30 and enabling the active device substrate 30 to be applicable to the display device with the high resolution ratio.

In the present embodiment, the first drain D1 is electrically connected to the first semiconductor pattern layer CH1 through the contact window H2, and the second drain D2 is electrically connected to the second semiconductor pattern layer CH2 through the contact window H4. The contact windows H2 and H4, for example, penetrate through a gate insulation layer GI, an interlayer insulation layer ILD and the insulation layer BP0. In some embodiments, the interlayer insulation layer ILD and the insulation layer BP0 can be patterned a same photomask, thus reducing the manufacturing cost of the active assembly substrate 30.

The active device substrate 30 is applicable to the display device. In one embodiment, the display device is, for example, a liquid crystal display device. In another embodiment, the display device is, for example, a display device with a high resolution ratio.

Based on the above, in the active device substrate according to at least one embodiment of the disclosure, a dual-gate first active device and a dual-gate second active device are electrically connected to the same scan line (that is, the dual-gate first active device and the dual-gate second active device are electrically connected to the second scan line), thereby reducing the total number of the scan lines and improving the aperture ratio of the active device substrate. Each of the first active device and the second active device includes dual gates, thereby solving the problem of electric leakage of the active device substrate. Therefore, the display device with the high resolution ratio using the active device substrate according to at least one embodiment of the disclosure has the advantages of high aperture ratio and low electric leakage at the same time.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A driving method of an active device substrate, comprising:
providing an active device substrate, wherein the active device substrate, comprising:

a substrate;
a first scan line, a second scan line, a third scan line, a first data line, and a second data line, located on the substrate, wherein the first scan line, the second scan line, and the third scan line are substantially extending along a first direction, the first data line and the second data line are extending along a second direction, and the first direction intersects with the second direction;
a first active device, comprising:
  a first gate, electrically connected to the first scan line;
  a second gate, electrically connected to the second scan line, wherein the first scan line and the second scan line transmit different driving signals;
  a first semiconductor pattern layer, overlapping the first gate and the second gate; and
  a first source and a first drain, electrically connected to the first semiconductor pattern layer, wherein the first source is electrically connected to the first data line;
a first pixel electrode, electrically connected to the first drain of the first active device; and
a second active device, comprising:
  a third gate, electrically connected to the second scan line;
  a fourth gate, electrically connected to the third scan line, wherein the second scan line and the third scan line transmit different driving signals;
  a second semiconductor pattern layer, overlapping the third gate and the fourth gate; and
  a second source and a second drain, electrically connected to the second semiconductor pattern layer, wherein the second source is electrically connected to the second data line; and
a second pixel electrode, electrically connected to the second drain of the second active device;
applying a first driving signal to the first scan line;
applying a second driving signal to the second scan line, wherein the first driving signal applied to the first scan line and the second driving signal applied to the second scan line are asynchronous at time sequences;
applying a first signal to the first data line so as to actuate the first active device in the period of applying the first driving signal to the first scan line and applying the second driving signal to the second scan line; and
applying a third driving signal to the third scan line in the period of applying the second driving signal to the second scan line, wherein the second driving signal applied to the second scan line and the third driving signal applied to the third scan line are asynchronous at the time sequences; and
applying a second signal to the second data line so as to actuate the second active device in the period of applying the second driving signal to the second scan line and applying the third driving signal to the third scan line.

2. An active device substrate, comprising:
a substrate;
a first scan line, a second scan line, a third scan line, a first data line, and a second data line, located on the substrate, wherein the first scan line, the second scan line, and the third scan line are substantially extending along a first direction, the first data line and the second data line are extending along a second direction, and the first direction intersects with the second direction;
a first active device, comprising:
  a first gate, electrically connected to the first scan line;
  a second gate, electrically connected to the second scan line, wherein the first scan line and the second scan line transmit different driving signals;
  a first semiconductor pattern layer, overlapping the first gate and the second gate; and
  a first source and a first drain, electrically connected to the first semiconductor pattern layer, wherein the first source is electrically connected to the first data line; and
a first pixel electrode, electrically connected to the first drain of the first active device, wherein a vertical projection of the first semiconductor pattern layer on the substrate is extending from a vertical projection of the first gate on the substrate to a vertical projection of the second gate on the substrate.

* * * * *